United States Patent [19]

Brown

[11] Patent Number: 4,564,349
[45] Date of Patent: Jan. 14, 1986

[54] EXTRUDER ASSEMBLY FOR EXTRUDING WATER-CURABLE SILANE MODIFIED POLYMERS

[75] Inventor: Geoffrey D. Brown, Bridgewater, N.J.

[73] Assignee: Union Carbide Corporation, Danbury, Conn.

[21] Appl. No.: 603,143

[22] Filed: Apr. 27, 1984

Related U.S. Application Data

[63] Continuation-in-part of Ser. No. 498,341, Jun. 1, 1983, Pat. No. 4,489,029.

[51] Int. Cl.⁴ .............................................. B29B 1/06
[52] U.S. Cl. .................................. 425/207; 425/113; 425/122; 425/133.1; 425/376 R; 425/131.1
[58] Field of Search ............ 425/4 C, 817 C, 113, 425/122, 131.7, 133.1, 376 R, 207; 366/88, 89, 90, 323, 324

[56] References Cited

U.S. PATENT DOCUMENTS

| | | |
|---|---|---|
| 2,471,324 | 5/1949 | Henning . |
| 2,765,491 | 10/1956 | Magerkurth . |
| 3,174,185 | 3/1965 | Gerber . |
| 3,676,034 | 7/1972 | Wendricks ........................ 425/208 |
| 3,954,366 | 5/1976 | Fields ................................. 425/208 |
| 4,025,274 | 5/1977 | Uemura et al. ............... 425/207 X |
| 4,039,168 | 8/1977 | Caris et al. ............................. 259/9 |
| 4,074,803 | 2/1978 | Kollberg ............................ 198/670 |
| 4,125,333 | 11/1978 | Fields .................................... 366/79 |
| 4,129,386 | 12/1978 | Raawendaal ........................ 366/88 |
| 4,136,132 | 1/1979 | Poole ............................. 264/211 X |
| 4,142,040 | 2/1979 | Jabaris et al. ...................... 528/502 |
| 4,155,690 | 5/1979 | Checkland et al. ............... 425/113 |
| 4,247,501 | 1/1981 | Easley et al. ................... 425/207 X |
| 4,253,771 | 3/1981 | Renk .................................... 366/89 |
| 4,300,840 | 11/1981 | Kishihiro ............................ 366/88 |
| 4,321,229 | 3/1982 | Blakeslee et al. . |
| 4,367,190 | 1/1983 | Beach ................................. 264/174 |

FOREIGN PATENT DOCUMENTS 2205426 8/1973 Fed. Rep. of Germany .

Primary Examiner—Robert Lindsay
Attorney, Agent, or Firm—James C. Arvantes; Robert C. Brown

[57] ABSTRACT

An extruder assembly for admixing and reacting a hydrolyzable silane reactant with a thermoplastic polymer to produce a water-curable, silane modified polymer and for extruding the resultant polymer into a shaped product.

3 Claims, 4 Drawing Figures

EXTRUDER ASSEMBLY FOR EXTRUDING WATER-CURABLE SILANE MODIFIED POLYMERS

This application is a continuation-in-part of copending U.S. application Ser. No. 498,341, filed June 1, 1983, now U.S. Pat. No. 4,489,029, granted Dec. 18, 1984.

SUMMARY OF THE INVENTION

The invention disclosed is an extruder assembly for admixing and reacting a hydrolzable silane reactant with a thermoplastic polymer to produce a water-curable, silane modified polymer. The extruder assembly comprises in sequence, a feed zone, a transition zone, a metering zone and a reaction zone from whence the reacted product is fed into an extrusion die and extruded therefrom as a shaped product.

BACKGROUND OF THE INVENTION

Conventionally, the production of extruded products, including coverings such as insulation and jacketing about wires and cables, from compositions based on water-curable, silane modified polymers has been carried out by feeding a composition containing a silane, a thermoplastic polymer and a catalyst to a single extruder wherein the components are blended and reacted to effect a grafting of the silane onto the polymer and from whence the composition containing the water-curable, silane modified polymer is extruded as a shaped product.

It has been found, however, that the production of extruded products from a single, conventional extruder requires the exclusion of moisture from the materials fed to the extruder and careful control of operating parameters, in general, in order to avoid the formation of voids in the extruded products.

The problem of voids in the extruded products has led to a modification of the single extruder approach of grafting a silane onto a thermplastic polymer and of extruding the resultant water-curable, silane modified polymer into a shaped product. As an alternative, it has been proposed to use a plurality of extruders, as disclosed in U.S. Pat. No. 4,136,132, patented Jan. 23, 1979. This expedient, however, has not substantially eliminated the formation of voids in the extruded products.

DETAILED DESCRIPTION OF THE INVENTION

The present invention provides an extruder assembly which tends to minimize the formation of voids in extruded products. The extruder assembly of this invention is particularly suitable for use in grafting a hydrolyzable silane, that is, a monomeric silane or a polysiloxane onto an alkylene-alkyl acrylate copolymer in the presence of an organo titanate catalyst and extruding the water-curable, silane modified copolymer into a product of desired shape.

Silanes, alkylene-alkyl acrylate copolymers, organo titanates and other modifiers are described in detail in U.S. Pat. Nos. 4,291,136, granted Sept. 22, 1981 and 4,328,323, granted May 4, 1982, the disclosures of which are incorporated herein by reference.

Basically, the extruder assembly comprises a series of zones wherein a reaction mixture, containing a silane, an alkylene-alkyl acrylate copolymer and an organo titanate, is admixed and reacted comprising, in sequence, a feed zone, a transition zone, a metering zone and a reaction zone which feeds the reacted mixture to the extrusion die.

The function of each zone is as follows:

Feed zone function: to convey material forward so that a substantially steady supply of material is fed to the succeeding zone, the transition zone. Typical temperatures in this zone are on the order of about 100° C. to about 180° C., preferably on the order of about 140° C. to about 160° C.

Transition zone function: to compress the material by providing a more shallow flow channel. The material is subjected to deformation and shearing forces, and for the most part melted in this zone due to a combination of mechanical energy input and thermal energy. Typical temperatures in this zone are on the order of about 130° C. to about 200° C., preferably about 150° C. to about 175° C.

Metering zone function: to complete the melting process and to pressurize the melt in order to provide a steady and metered out-put rate of reacted material to the extrusion die orifice. Typical temperatures in this zone are on the order of about 130° C. to about 220° C., preferably on the order of about 160° C. to about 190° C.

Reaction zone function: to allow sufficient time at the metering zone temperatures in order to insure that substantially complete reaction or grafting has occurred.

Reference is now made to the accompanying drawings which will be discussed in reference to grafting of a silane "reactant" onto an ethylene-ethyl acrylate copolymer in the presence of an organo titanate catalyst and dibutyltin dilaurate, a silanol condensation catalyst.

Figure 1:
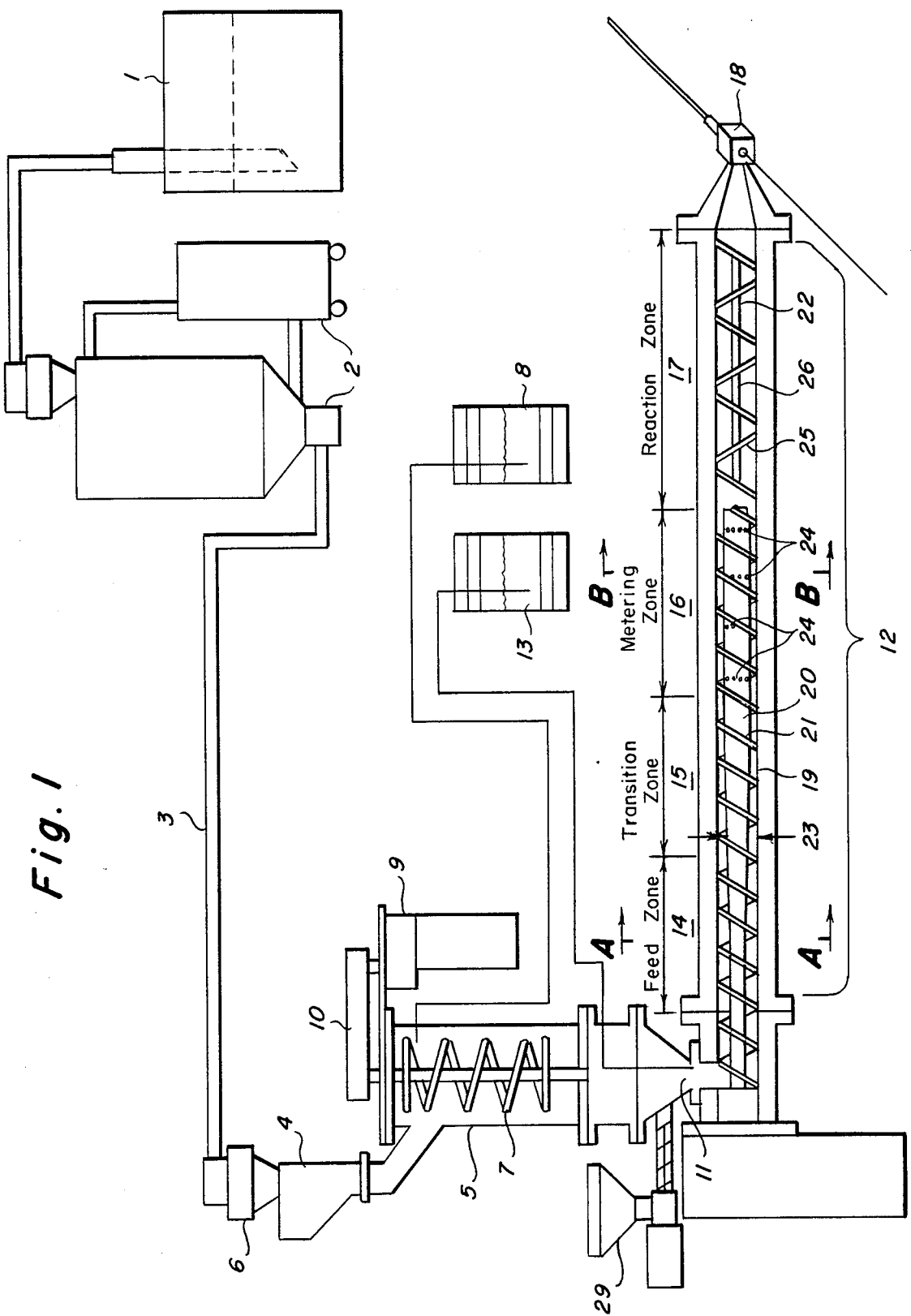
FIG. 1 is a schematic view of the extruder assembly of the present invention.

Referring now to FIG. 1, a pelletized mixture of an ethylene-ethyl acrylate copolymer and dibutyltin dilaurate is fed from feedstock bin (1) to dryer system (2) wherein the pelletized mixture is dried in order to insure that the water content thereof is below about 500 ppm, preferably below about 300 ppm.

From dryer system (2), the pelletized mixture is fed through conveyor line (3) and into receiver (4) of vertical blender (5) by means of vacuum loader (6).

Vertical blender (5) contains an open helix mixer (7) which aids in dispersing organo titanate throughout the pelletized mixture. The organo titanate is pumped into the top of vertical blender (5) from reservoir (8). Helix mixer (7), driven by motor (9) through gear reducing driving belt (10), provides a fluidizing agitation, thoroughly mixing the pellets and organo titanate.

Residence time of the pelletized mixture in vertical blender (5) is sufficient to soak the organo titanate into the pellets as evidenced by absence, essentially, of liquid (wetness) on the surface of the pellets.

The resultant soaked pellets drop directly into hopper (11) of the extruder assembly (12) and are contacted therein with a polysiloxane or monomeric silane pumped from reservoir (13).

The amount of silane "reactant" fed into hopper (11) is generally about 0.05 to about 10, preferably about 0.3 to about 5 percent by weight, based on the weight of the copolymer.

The amount of organo titanate used to soak the pelletized mixture is sufficient to inhibit the adverse effects of moisture, present in the composition or generated therein during processing. Generally, the weight ratio of organo titanate to polysiloxane or monomeric silane is at least about 0.1 to 1, generally about 0.5 to about 10 to one, preferably about 1 to about 5 to one, and most preferably about 1 to about 3 to one.

The total reaction mixture containing the ethylene-ethyl acrylate copolymer, the silanol condensation catalyst, organo titanate and silane "reactant" passes into the extruder assembly wherein the reaction mixture is mixed, reacted and from whence the reacted product is fed into an extrusion die and extruded therefrom as a shaped product.

Material from hopper (11) drops into free zone (14) of the extruder assembly (12).

Extruder assembly (12) comprises a feed zone (14), a transition zone (15), a metering zone (16) and a reaction zone (17) from whence reacted product is fed into extrusion die (18).

Feed zone (14), transition zone (15) and metering zone (16) are defined by a cylindrical barrel housing (19) having mounted therein a rotating compression screw (20) with screw flights (21). Rotation of compression screw (20) causes material to pass through extruder assembly (12). Mixer (22) mounted within cylindrical barrel housing (19), at the end of rotating compression screw (20), defines reaction zone (17) which feeds into extrusion die (18).

Channel depth (23), defined between the root diameter of rotating compression screw (20) and the inner wall of cylindrical barrel housing (19), is substantially constant, within feed zone (14). This provides a substantially steady supply of material to be fed to the transition zone (15). The channel depth within transition zone (15) uniformly decreases from feed zone (14) to metering zone (16), while the channel depth within metering zone (16) is substantially constant.

Figure 2:
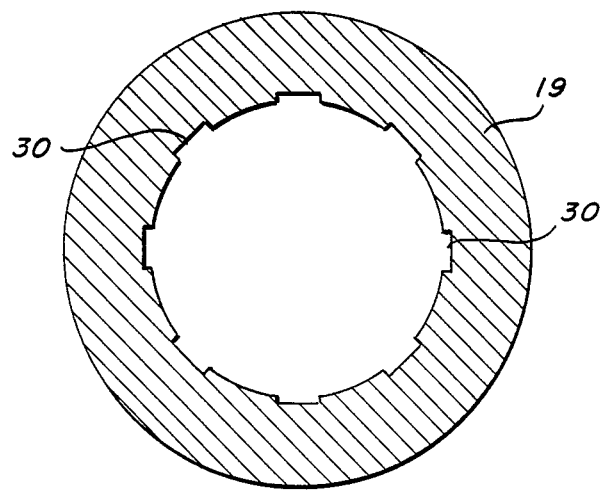
FIG. 2 is a cross-sectional view taken along line A—A of FIG. 1 showing details of a grooved barrel at the feed zone of the extruder assembly.

The interior of cylindrical barrel housing (19) within feed zone (14) is preferably grooves as shown in FIG. 2 which is a cross-sectional view taken across line A—A of FIG. 1. The grooves (30) improve the friction between the material, passing through feed zone (14), and the inner wall of barrel housing (19). This, in turn, stabilizes the force feeding of material from feed zone (14) into transition zone (15) despite the lubricating effect of the polysiloxane or monomeric silane reactant.

In transition zone (15), the channel depth decreases, as previously stated. The more shallow flow channel provided, causes material passing therethrough to be subjected to deformation and shearing forces, and heat from the extruder barrel (19) thereby initiating the melting of the material.

Figure 3:
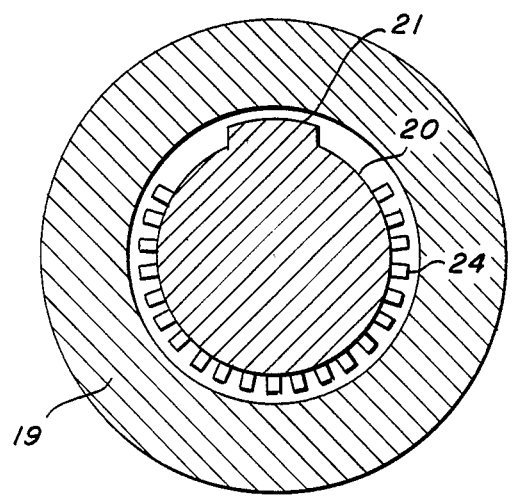
FIG. 3 is a cross-sectional view taken along line B—B of FIG. 1 showing mixing pins in the metering zone of the extruder assembly.

From transition zone (15), melted material passes into metering zone (16), the channel depth of which, as previously stated, is substantially constant. Metering zone (16) preferably contains several sets of mixing pins (24) which project from compression screw (20) toward the inner wall of barrel housing (19) as more clearly shown in FIG. 3. Mixing pins (24) are substantially perpendicular to the axis of rotating compression screw (20). Mixing pins (24) provide a partial barrier to the flow of material in metering zone (16) and insure that the material is homogeneously melted and mixed.

From metering zone (16), material passes into reaction zone (17) wherein the grafting reaction between the silane and ethylene-ethyl acrylate copolymer goes essentially to completion. Reaction zone (17) generally contains a mixing device of either a static or dynamic design, providing a uniform residence time for the material in reaction zone (17), thus essentially completing the grafting reaction.

Static mixer (22), shown in FIG. 1, is made up of a series of vanes (25) mounted on a static shaft (26) in cylindrical barrel housing (19). Vanes (25) of the static mixer (22) split and rotate the flow pattern of the material passing through reaction zone (17) thereby insuring completion of the grafting reaction.

Figure 4:
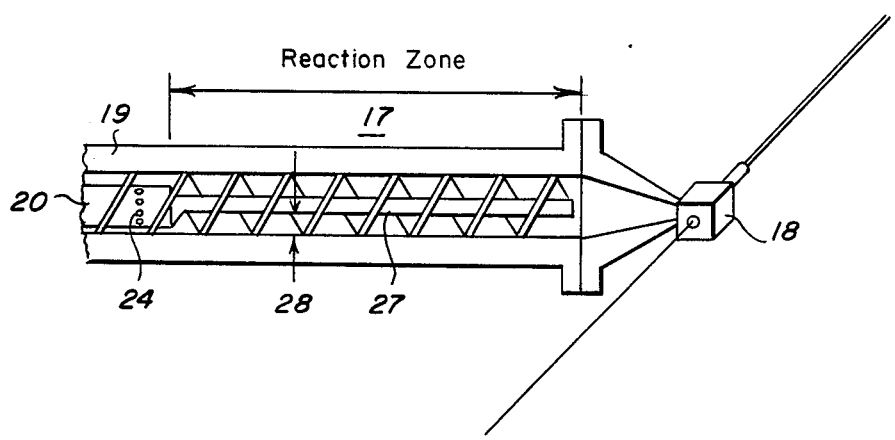
FIG. 4 is a schematic view of a dynamic mixer which defines a reaction zone of the extruder assembly of the present invention.

A suitable dynamic mixer is shown in FIG. 4 and is identified by numeral 27. Dynamic mixer (27) is attached to and rotates with compression screw (20). Dynamic mixer (27) is similar in design to the metering zone section of rotating screw (20) except in channel depth (28) which is substantially greater than the channel depth in metering zone (16). Increased channel depth in reaction zone (17) allows a longer residence time for a greater volume of material, allowing the grafting reaction to go essentially to completion.

The dynamic mixer has an additional advantage in reducing areas of slow moving material, usually a problem with the use of static mixers. The effect of the slowly moving material in static mixers can be shown by the longer time required for changing from one color to another during the insulation of wire. Colorants may be added through an auger-type colorimeter (29) as shown in FIG. 1. When using a static mixer, a typical color change will take 26 minutes at 100 pounds per hour output on a 2.5 inch diameter extruder assembly. The dynamic mixer reduces this time to 9.5 minutes.

From reaction zone (17), material passes into and is extruded from extrusion die (18).

In the example which follows, the composition was extruded onto a #14 AWG copper wire using a 2½ inch extruder having:

1. A 30 to 1 length to diameter grooved barrel.
2. A feed zone, transition zone, metering zone, and reaction zone wherein each zone was 10 inches, 15 inches, 25 inches, and 30 inches in length respectively.
3. A uniformly and axially grooved barred at the feed zone wherein the grooves were 30 mils in depth and wherein the distance between centers was one inch.
4. A 20 to 1 "polyethylene" compression screw having a 2.5 inch diameter, tapered as previously discussed and cored allowing for control of temperature by feeding water into the core.
5. Four sets of radial mixing pins equally spaced along the metering zone and perpendicular to the axis of the screw and measuring about 0.15 inch in length.
6. Band heaters, providing independent temperature control of each zone.
7. Lead distance between succeeding flights of screws, at the apex, was constant at 2.5 inches.

The materials used were a pelletized mixture of dibutyltin dilaurate and Formulation 1; tetraisopropyl titanate and polysiloxane.

| Formulation | Percent By Weight |
|---|---|
| Copolymer of ethylene-ethyl acrylate containing 15 percent by weight combined ethyl-acrylate-melt index - 1.6 | 56.15 |
| Talc coated with zinc stearate | 21.68 |
| Antimony oxide | 2.50 |
| Calcium carbonate | 2.50 |
| Ethylene (bis-tetrabromo-phthalimide) (flame retardant additive) | 16.29 |
| Polymerized 1,2-dihydro-2,3,4-trimethyl quinoline (antioxidant) | 0.58 |
| Vinyl tris(2-methoxyethoxy) silane | 0.30 |
| | Percent By Weight Based on Formulation 1 |
| Dibutyltin dilaurate | 0.04 |
| Tetraisopropyl titanate | 0.79 |
| Polysiloxane | 0.80 |
| Weight ratio of organo titanate to polysiloxane | 1 |

The polysiloxane used was prepared according to Example 3 of U.S. Pat. No. 4,328,323 with the exception that 235 grams (1.03 moles) of ethyl laurate were substituted for ethyl benzoate.

The polysiloxane can be depicted, ideally, as follows:

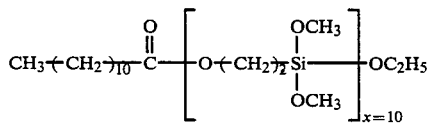

| | |
|---|---|
| Moisture content of pelletized mixture after drying | 149 ppm |
| Soak time of pelletized mixture of dibutyltindilaurate and Formulation 1 with organo titanate | 10 minutes |
| Screw speed | 94 rpm |
| Screw cooling water fed into core at a temperature of 53° C. and rate of 75 gallons per hour - temperature at removal - 68° C. | |
| Rate of extrusion | 199 lbs. per hour |
| Wire speed | 500 feet per minute |

| Temperature and Pressure Profile | | | | | |
|---|---|---|---|---|---|
| | Feed Zone | Transition Zone | Metering Zone | Reaction Zone | Extrusion Die |
| Temperature of heaters, Set temperature, (°C.) | 154 | 150 | 154–171 | 160 | 204 |
| Material temperature, (°C.) | 153 | 159 | 166 | 163–175 | 191 |
| Pressure, (psi) | — | 3200–4600 | 5000–5500 | 5300–5400 | 5200 |

For the purposes of conducting the Monsanto Rheometer test, insulation was stripped from the wire, place in a water bath, which was at a temperature of 75° C., for 18 hours and then pressed into 0.150 inch thick plaques under the following conditions:

| | |
|---|---|
| Pressure | 3 tons |
| Temperature | 125° C. |
| Time Cycle | 5 minutes heating |
| | 5 minutes cooling |

| Tests and Test Results | |
|---|---|
| Rheometer-ASTMD-2084-75 | reported in inch-lbs and indicates the level of cure |
| Number of Voids | cross-section of uncured insulation was examined under 40X magnification and voids per grid counted |
| Thickness of Insulation | 37 mils |
| Spark Faults | test described in Underwriters Laboratories Standard UL-44 "Rubber Insulated Wires and Cables" as revised January 1, 1982, paragraphs 70–72. This test determines if there are any minute holes in the uncured insulation which would allow the current to short to ground. UL specifies that there be no faults in a completed cable, but industry standards allow for a maximum of one per 3000 feet of cable as made in a commercial run. The UL requirement is then met by cutting out the voids or faults from the cable and splicing the wire ends together. |
| Stability | calculated from diameter fluctuations as expressed as ± of total output. Normal deviation of extrusion lines is ±2 percent. |
| Test Results | |
| Monsanto Rheometer | 42 inch-lbs |
| Number of Voids | 15 per grid |
| Spark Faults | 0 per 13,500 feet of insulation |
| Stability | ±1.8 percent |

What is claimed is:

1. An extruder assembly, suitable for admixing and reacting a composition containing a silane and a thermoplastic polymer to form a water-curable, silane modified thermoplastic polymer and for extruding said silane modified polymer, comprising a cylindrical barrel housing and a rotating compression screw mounted within said barrel housing, the channel depth defined between the root diameter of said compression screw and said cylindrical barrel housing being substantially constant, uniformly decreasing and being substantially constant thereby defining in sequence, a feed zone, a transition zone and a metering zone, the portion of said cylindrical housing which, in conjunction with said compression screw defines the feed zone being axially grooved and that portion of the rotating compression screw in the metering zone having mixing pins extending substantially perpendiculary therefrom, a mixer, mounted at the terminal end of said rotating compression screw for receiving material from said metering zone, defining a reaction zone wherein the reaction between the silane and the thermoplastic polymer is substantially completed and from which zone the reacted product is fed into an extrusion die positioned at the terminal end of said reaction zone, said mixer comprising a series of vanes on a stationary shaft mounted in a cylindrical barrel housing or said mixer is a dynamic device mounted to and rotating with said rotation compression screw comprising a rotating screw defining, in conjunction with the cylindrical barrel of the extruder assembly, a channel depth greater than the channel depth of said metering zone and means to rotate said rotating compression screw whereby material is fed through said feed zone, transition zone, metering zone and reaction zone and into and out of said extrusion die.

2. An extrusion assembly as defined in claim 1 wherein the said mixer is a dynamic device mounted to and rotating with said rotating compression screw comprising a rotating screw defining, in conjuction with the cylindrical barrel of the extruder assembly, a channel depth greater than the channel depth of the metering zone.

3. An extrusion assembly as defined in claim 1 wherein said mixer is a static device comprising a series of vanes on a stationary shaft mounted in a cylindrical barrel housing.

* * * * *

UNITED STATES PATENT AND TRADEMARK OFFICE
CERTIFICATE OF CORRECTION

PATENT NO.   : 4,564,349
DATED        : January 14, 1986
INVENTOR(S)  : Geoffrey D. Brown It is certified that error appears in the above-identified patent and that said Letters Patent is hereby corrected as shown below:

| | |
|---|---|
| Column 1, line 12 | "hydrolzable" should read -- hydrolyzable -- |
| Column 1, line 40 | "thermplastic" should read -- thermoplastic -- |
| Column 3, line 22 | "free" should read -- feed -- |
| Column 3, line 47 | "grooves" should read -- grooved -- |
| Column 4, line 52 | "barred" should read -- barrel -- |
| Column 5, line 64 | "For the purposes" should read -- For purposes -- |
| Column 5, line 65 | "place" should read -- placed -- |
| Column 6, line 54 | "perpendiculary" should read -- perpendicularly -- |
| Column 6, line 64 | "rotation" should read -- rotating -- |

Signed and Sealed this

Fifteenth Day of April 1986

[SEAL]

Attest:

DONALD J. QUIGG

Attesting Officer   Commissioner of Patents and Trademarks